Feb. 4, 1958 D. K. THOMAS Re. 24,425

FORM AND METHOD OF CASTING A CONCRETE ROOF

Original Filed March 3, 1955 2 Sheets-Sheet 1

INVENTOR

DONALD K. THOMAS,

BY James N. Ryles

ATTORNEY

Feb. 4, 1958 D. K. THOMAS Re. 24,425

FORM AND METHOD OF CASTING A CONCRETE ROOF

Original Filed March 3, 1955 2 Sheets-Sheet 2

INVENTOR

DONALD K. THOMAS,

BY James H. Ryle

ATTORNEY

United States Patent Office

Re. 24,425

Reissued Feb. 4, 1958

24,425

FORM AND METHOD OF CASTING A CONCRETE ROOF

Donald K. Thomas, West Hollywood, Fla.

Original No. 2,798,279, dated July 9, 1957, Serial No. 491,867, March 3, 1955. Application for reissue August 5, 1957, Serial No. 677,190

3 Claims. (Cl. 25—118)

Figure 1:
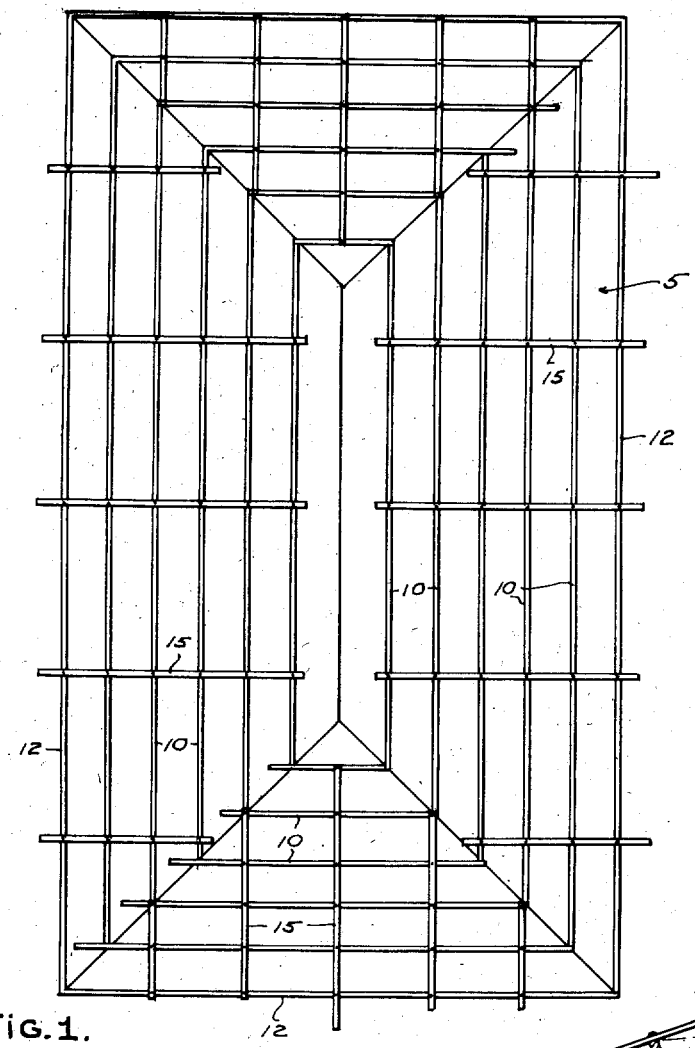

Matter enclosed in heavy brackets [ ] appears in the original patent but forms no part of this reissue specification; matter printed in italics indicates the additions made by reissue.

This invention relates to roof constructions and primarily to novel form means whereby the roof may be poured into an integral stepped slab.

The invention contemplates novel form devices that are supported upon the roof in a manner whereby a concrete mix may be poured to form a complete and integral concrete roof having equidistantly spaced stepped portions, and whereby the forms may be subsequently removed.

The invention further contemplates novel form devices that are supported upon the roof in parallel relation and with the form devices being spaced a predetermined distance above the roof whereby to permit a concrete mix to be poured therein and with the concrete mix flowing beneath the form devices to assume a predetermined angularity with respect to the roof and with the form devices being subsequently removed to present a novel integral stepped roof.

Various features of construction and operation of the device will be clearly apparent during the course of the following description, reference being had to the accompanying drawings, wherein has been illustrated the preferred forms of the device and wherein like characters of reference are employed to denote like parts throughout the several figures.

Figure 2:
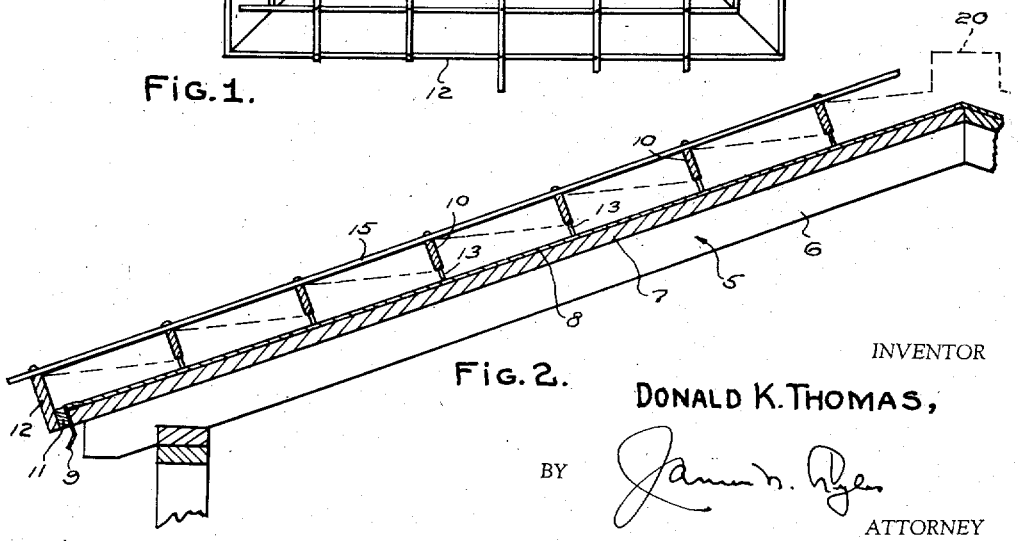
Figure 3:
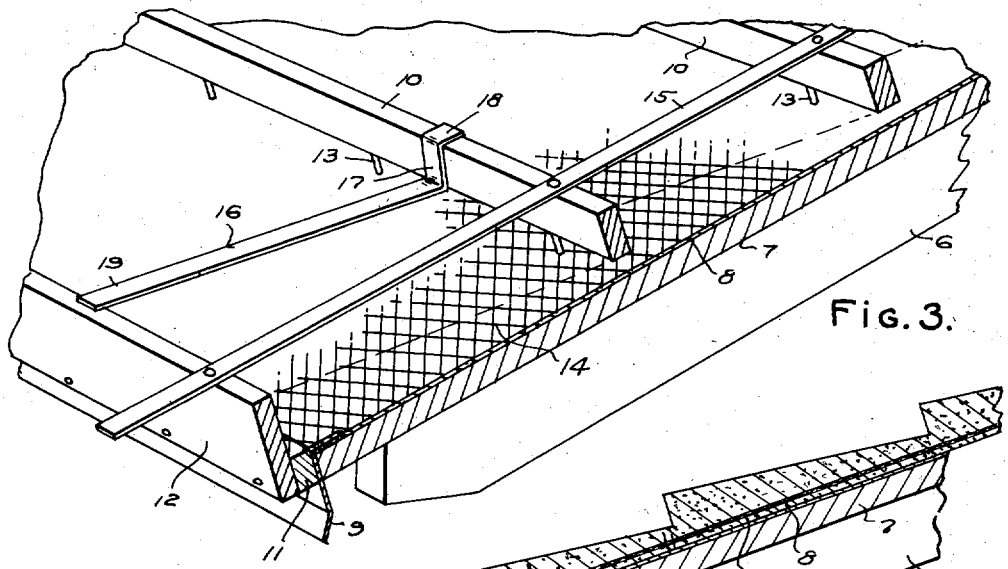
Figure 4:
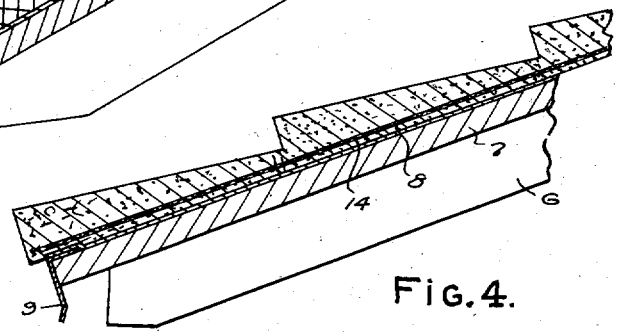
Figure 5:
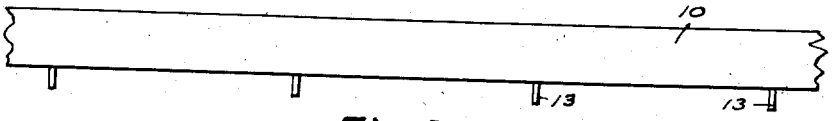
Figure 6:
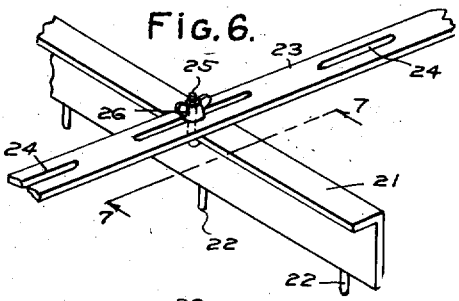
Figure 7:
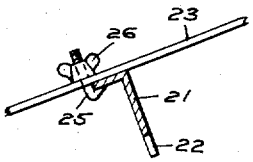
Figure 8:
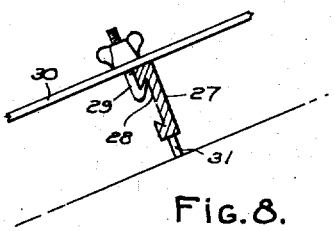

In the drawings:

Figure 1 is a top plan view of a roof and with the form devices of this invention supported thereon preparatory to completing the roof, Figure 2 is a sectional view illustrating the manner of mounting and supporting the form devices preparatory to pouring the slab, Figure 3 is a fragmentary perspective view on an enlarged scale illustrating the form devices supported in position upon the roof and illustrating a means for tying the several form devices together against shifting, Figure 4 is a fragmentary section illustrating a completed roof slab, Figure 5 is a fragmentary side elevation of one form device, Figure 6 is a fragmentary perspective view of a modified form of form device and its supporting means, Figure 7 is a section taken substantially on line 7—7 of Figure 6, and Figure 8 is a transverse section through a modified form of the form device.

Referring specifically to the drawings, the numeral 5 designates a conventional roof embodying rafters 6, sheathing 7 and a layer of building paper 8. The marginal edge of the roof is provided with the usual flashing strip 9, nailed or otherwise attached to the edge of the sheathing 7 and with its upper flange underlying the marginal portion of the paper 8, as is customary. It is contemplated that substantially an entire roof shall be poured at one operation and where possible in a conventional roof design a plurality of form strips 10 are arranged in parallel relation over the building paper 8. One conventional arrangement of the strips 10 is shown in Figure 1 where a hip type of roof has been illustrated and wherein the strips 10 are disposed longitudinally of each roof area and with the strips of the end portions of the roof having abutting and overlapping engagement with the strips upon the longitudinal portions of the roof whereby to effect a plurality of continuous channels entirely over and around the complete area of the roof. Temporarily connected over the flashing 9 and substantially flush with the paper covering 8 is a spacer strip 11. The strip 11 is of a width corresponding to the degree of overhang of the concrete slab to be poured. Fixed to the strip 11 is a facia board 12 that projects above the strip 11 a distance corresponding to the maximum thickness of the slab. The strip 11 and the board 12 will be subsequently removed after the slab has been poured and suitably cured and the board 12 constitutes the supporting means for the several strips 10 whereby to hold the strips 10 in a predetermined parallel and spaced apart relation. Each strip 10 is provided at spaced apart points with legs 13 that normally rest upon the surface of the paper 8 and with the combined height of the strip 10 and the legs 13 being substantially identical to the height of the board 12 above the strip 11. Any suitable mesh wire reinforcing 14 is first disposed over the paper 8 to be embedded within the slab to be poured. Since the board 12 presents a face that is at right angle to the surface of the roof, it is essential that the several strips 10 be supported in a corresponding position. For this purpose, there has been provided a plurality of straps 15 formed of either wood or metal, and these straps 15 are apertured at predetermined points corresponding to the spacing of the strips 10. The straps 15 are nailed or otherwise connected with the board 12 and the several parallel strips 10 in each group whereby to maintain the strips in a predetermined angularity and spacing against shifting, and with the lower edge of the strips 10 being in spaced relation to the paper 8 that is dimensioned to correspond to the minimum thickness of the stepped portions of the slab to be poured. The legs 13 may, if desired, rest upon small metal discs or the like (not shown) whereby to avoid piercing the paper 8.

Now with the several form strips in supported relation upon the roof area, the operator proceeds to pour a concret mix in the uppermost channel formed by the strips and, as the mix is continued downwardly, it will flow beneath the lower edges of the strips 10 and around the legs 13 to the top of the next lower adjacent strip 10. As each channel is filled with the concrete mix, a suitable trowel, such as that illustrated in Figure 3 and designated by the numeral 16, is troweled over the surface to impart a smooth finish to that particular stepped portion of the slab. The trowel 16 has a length sufficient to extend from one strip 10 to another whereby it is jointly supported upon two adjacent strips. The trowel 16 is angled upwardly, as at 17, and outwardly, as at 18, whereby to form a rest that is shifted by the operator along the form strip. The angled portion 17 terminates at the lower edge of the strip 10, while its tail portion 19 overlies the next adjacent strip. Thus, the concrete is troweled from the top of one strip downwardly to the bottom of the next upper strip. The procedure is continued over the entire area of the roof down to the facia board 12, in each instance the successive stepped portions being troweled to a smooth surface. As the concrete is poured into the forms, it obviously embeds the mesh 14 whereby to impart sufficient strength to the slab against cracking. After the concrete has set a sufficient length of time, the straps 15 are removed and the several form strips 10 are lifted upwardly, pulling their legs 13 outwardly from the slab, leaving the roof area covered by a continuous slab of concrete in uniform stepped sections. The openings left by the legs 13 are subsequently pointed up with cement whereby to prevent the entry of water to the paper 8. The strip 11 and the facia board 12 are removed, leaving the lowermost stepped portion of the slab in overhanging relation to the flashing 9, such being customary with tile or shingled roofs. It should be here pointed out that a cap portion, indicated at 20 in dotted lines in Figure 2, is first formed upon the ridge of the roof preparatory to pouring the rest of the slab.

In Figure 6 there has been illustrated a slightly modified form of form strips 10, here shown as being formed of angle iron 21 having the proper height corresponding to the height of the step to be formed. The lower edge of the angle iron 21 is provided with the supporting legs 22, corresponding to the legs 13. A connecting strap 23, corresponding to the strap 15, is preferably formed of metal, and this strap 23 is provided with a plurality of slots 24 for the passage of hook bolts 25 carrying preferably wing nuts 26. In use, a facia board and a spacer strip are employed as before, after which the several form elements 21 are arranged upon the roof and engaged by the hook bolts 25 in a manner shown clearly in Figure 7 whereby the several forms may be rigidly held in their spaced parallel relation. The operation of this device is substantially identical to that first described as to arrangement upon the roof for its complete area, the pouring of the concrete mix and the subsequent removal of the forms.

In Figure 8 there has been illustrated a further modified form of form strip 27, here illustrated as having one face grooved and under-cut, as at 28, for the reception of a hook bolt 29 passing through a strap 30, similar to the strap 23. The form 27 also carries the spacing legs 31 whereby the form is spaced above the roof a predetermined distance corresponding to the minimum thickness of the slab at the point of stepping.

It will be apparent from the foregoing that a very simple and novel form has been provided whereby an operator may completely pour an integral stepped concrete roof and with a minimum of effort and time in installing the forms and their subsequent removal. The forms are of such nature as will readily permit them to be assembled upon numerous roofs of varying sizes and with the terminal ends of the strips being overlapping and in abutment whereby to minimize the number of forms necessary and to avoid the necessity of cutting the forms for a particular roof. The supporting straps 15, 21 and 30 greatly facilitate the supporting of the forms in an accurately spaced and parallel manner in a minimum of time. The several parts are extremely simple in construction, are strong, cheap to manufacture and have a relatively long life since they may be used over and over, thus greatly reducing the cost of installing an integral stepped roof slab.

It is to be understood that the invention is not limited to the precise structural details illustrated but that changes are contemplated as readily fall within the spirit of the invention as determined by the scope of the subjoined claims.

Having described my invention, what I claim as new and desire to secure by Letters Patent is:

1. A form for pouring a one-piece concrete roof slab and wherein the form constitutes longitudinally extending troughs, the form embodying a plurality of substantially identical form devices having flat sides and with an upper edge of each form device being at a right angle, spacing legs formed upon the lower edge of each form device whereby to support the form with its lower edge in spaced parallel relation to a roof surface to be covered, a facia board detachably connected with the free edge of the roof and projecting thereabove and a plurality of straps connected with the facia board and with the form devices, each of the straps being provided with spaced longitudinal slots and hook bolts that engage through the slots and have hooked and clamping engagement with angled upper edges of the form devices whereby the several form devices are adjustably held at a predetermined angularity with respect to the roof surface to be covered and in a predetermined spaced parallel relation to each other and to the facia board.

2. The hereindescribed method of forming an integral stepped concrete roof slab over the entire area of a roof and wherein the roof embodies a ridge and a plurality of inclined and connecting roof sections, that comprises supporting a plurality of form strips longitudinally of each roof section and with the strips being in spaced parallel relation to each other to constitute troughs, the strips of connecting sections overlying and abutting the ends of the strips of the adjacent sections whereby the troughs extend entirely around the roof, the lower edges of each strip being in spaced relation to the roof surface, facia boards that are connected to the free edges of each roof section, connecting straps fastened to the facia boards of each section and that are connected to the several form strips of their respective section whereby to hold the strips in spaced parallel relation throughout their length, the concrete being poured into the uppermost trough to flow beneath the low edge of the adjacent form for progressively filling the troughs to the top edge of a next lower adjacent form strip, trowelling the poured concrete from the lower edge of one form strip to the top edge of the next lower form strip whereby to form stepped portions having a maximum thickness corresponding to the height of one form strip and a minimum thickness corresponding to the lower edge of the next adjacent strip and then removing the several form strips and the facia boards after the concrete has hardened.

*3. The hereindescribed method of forming an integral stepped concrete roof slab over the entire area of a roof and wherein the roof embodies a ridge and a plurality of inclined and connecting roof sections, that comprises supporting a plurality of form strips longitudinally of each roof section and with the strips being in spaced parallel relation to each other to constitute troughs, the strips of connecting sections overlying and abutting the ends of the strips of the adjacent sections whereby the troughs extend entirely around the roof, the lower edges of each strip being in spaced relation to the roof surface, facia boards that are connected to the free edges of each roof section, the concrete being poured into the uppermost trough to flow beneath the lower edge of the adjacent form for progressively filling the troughs to the top edge of a next lower adjacent form strip, trowelling the poured concrete from the lower edge of one form strip to the top edge of the next lower form strip whereby to form stepped portions having a maximum thickness corresponding to the height of one form strip and a minimum thickness corresponding to the lower edge of the next adjacent strip and then removing the several form strips and the facia boards after the concrete has hardened.*

References Cited in the file of this patent or the original patent

UNITED STATES PATENTS

| | | |
|---|---|---|
| 974,002 | Walton | Oct. 25, 1910 |
| 1,020,586 | Walton | Mar. 19, 1912 |
| 1,052,245 | Hackwerth | Feb. 4, 1913 |
| 1,075,403 | Cole | Oct. 14, 1913 |
| 1,319,385 | Gottschalk | Oct. 21, 1919 |
| 1,637,998 | Heltzel | Aug. 2, 1927 |
| 1,674,908 | Madsen | June 26, 1928 |
| 1,819,916 | Murphy | Aug. 18, 1931 |